Dec. 23, 1941.                L. D. COBB                2,267,443
                               TOP ROLL
                         Filed Sept. 27, 1940
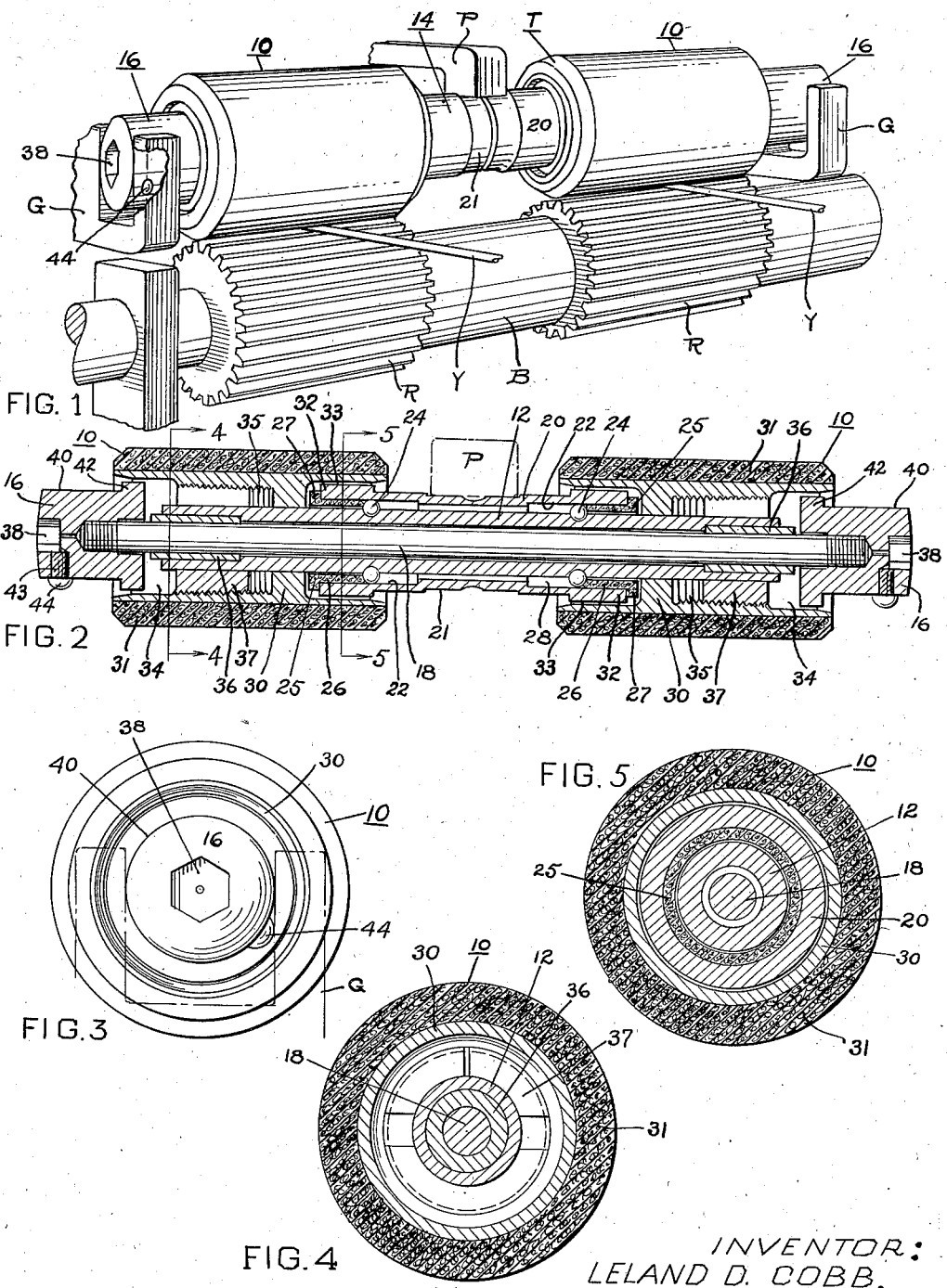
INVENTOR:
LELAND D. COBB,
BY
Romeyn A. Spare
HIS ATTORNEY.

Patented Dec. 23, 1941

2,267,443

UNITED STATES PATENT OFFICE 2,267,443

TOP ROLL

Leland D. Cobb, Forestville, Conn., assignor to General Motors Corporation, Detroit, Mich., a corporation of Delaware Application September 27, 1940, Serial No. 358,601

7 Claims. (Cl. 19—142)

This invention relates to top rolls for attenuating machinery in the textile industry, and particularly to top rolls for spinning frames, drawing frames and similar devices wherein a thread, roving or yarn is stretched and reduced in size by passing it between top and bottom rolls that are urged into peripheral rolling contact with each other.

One object of my invention is to provide a simplified top roll unit having a demountable roll member at each side of a central antifriction bearing and having improved end guiding means for axially positioning the top roll. A further object is to provide a unit handling antifriction mounted top roll having end hubs rigidly secured to an element journalled in the top roll.

To these ends and also to improve generally upon devices of the character indicated, the invention consists in the various matters hereinafter described and claimed.

In the accompanying drawing:

Figure 1 is a perspective view showing an application of this invention;

Figure 2 is a longitudinal section through the top roll;

Figure 3 is an end elevation of the top roll;

Figure 4 is a diametrical section taken along the line 4—4 of Figure 2 and looking in the direction indicated by the arrows; and Figure 5 is a diametrical section along the line 5—5 of Figure 2 and looking in the direction indicated by the arrows.

Generally stated, I have provided a unit-handling top roll T that has the top roll members 10 demountably fastened in spaced relation on a sleeve 12 at the ends of a central antifriction bearing 14, and axially projecting guide caps 16, rigidly fastened upon the ends of a rod 18 extending through and journalled in the sleeve 12, are vertically slidable and non-rotatably received in non-bottoming relation in slotted guide brackets G. The top roll members 10 are peripherally supported in rolling contact with similarly positioned bottom roll members R formed on a suitably driven bottom roll B, and a pressure foot P is yieldably urged downwardly against the bearing 14 so that strips of roving or yarn, as Y, will be attenuated as they are respectively passed between each of the opposed top and bottom roll members.

Referring in detail to the drawing, the outer race ring 20 of the bearing 14, which is annularly grooved at 21 to receive the pressure foot P, has internally cylindrical walls 22 that roll on spaced rows of balls 24 which also roll in spaced raceways on the sleeve 12. Each end of the bearing 14 is closed by an annular seal 25 that has a reduced tubular portion 26 pressed into the end of the outer race ring 20. An end flange 27 on each seal 25 abuts the outer race ring to locate the inner end of each tubular portion 26 in closely spaced relation to the respective ball rows 24 so that the outer race ring 20 is axially positioned in rotatable unit-handling relation with the sleeve 12 which forms an inner race ring. The ball chamber 28 may be charged with a suitable lubricant during bearing assembly, and the seals 25 maintain this lubricant within the bearing. These seals 25, which are preferably composed of a suitable lubricant impregnated bearing material such as a molded fibrous material, commonly known as "Textolite," have internal bores of slightly greater diameter than the diameter of that portion of the sleeve 12 which they surround. Normally, the sleeve 12 rotates on the balls 24 out of contact with the seals 25, but in the event of ball breakage due to improper lubrication, these lubricant impregnated seals will serve in the capacity of well lubricated plain bearings which facilitate free rotation of the sleeve 12 until the ball bearing 14 may be conveniently repaired.

The top roll members 10 have interchangeable hubs 30 carried by the sleeve 12, and these hubs are peripherally covered by cots 31 composed of suitable yieldable material such as cork or rubber. The ends of the normally non-rotatable outer race ring 20 are provided with annular flanges 32 that lie in closely spaced relation to the hubs 30 and within the respective counterbores 33 at the inner ends of these hubs. These flanges 32 prevent the entrance of lint into the bearing or between the relatively rotating parts. The outer end of each hub 30 is counterbored at 34, and extending inwardly from this counterbore is an axially tapered thread 35 arranged to receive a split tapering threaded collar 37 which is screwed into wedged clamping relation between the hub and the sleeve 12 for demountably locking the top roll member 10 to the sleeve 12 in desired axial position.

The counterbored ends of the sleeve 12 have bushings 36 pressed therein to rotatably receive the through rod 18 which is threaded on its ends for demountably and tightly receiving the end caps 16 in closely spaced relation to the bushings 36. These end caps may be provided with internal wrench sockets 38 so that they may be tightly screwed into rigid unit-handling relation with the rod 18, and the cylindrical portion 40 of each end cap, which is slidably received in non-bottoming relation in the groove between the vertical arms of the guide G, terminates at its inner end in a peripheral flange 42 that is received in closely spaced relation to the hub 30 and within the end counterbores 34. The flanges 42 act in a similar manner to the flanges 32 and cooperate with the hub 30 in preventing the entrance of lint between relatively rotating parts at the ends of the top roll. One or both of the cylindrical portions 40 of the end caps 16 is provided with a drive screw 43 that has a protruding head 44 which abuts against one of the side arms of the guide G to prevent the end caps and rod 18 from rotation.

With my invention, in the event of damage to a top roll or when the covering cots 31 become worn, the replacing of a top roll may be quickly and easily accomplished by removing the pressure foot, lifting out the worn top roll and sliding a new top roll as a unit into position between the guides G. Furthermore, my top roll will not tend to laterally and angularly shift out of position, since the end caps, which vertically slide in the guides G, are rigidly fastened to the through-rod 18 that is journalled in the bearings 36 which are located at the ends of the top roll.

I claim:

1. In a top roll of the character indicated, a sleeve, spaced top roll members mounted on said sleeve, a bearing member rotatably receiving the sleeve and in unit-handling relation therewith, a rod extending through and journalled in said sleeve, and caps rigidly secured to the rod at the ends of said sleeve.

2. In a top roll of the character indicated, a sleeve, a pair of top roll members demountably secured to the sleeve in spaced relation, an element on the sleeve and between said roll members, said element and said sleeve being relatively rotatable, a rod axially extending through and journalled in said sleeve, and caps respectively fastened to the ends of said rod.

3. In a top roll of the character indicated, a sleeve, a pair of interchangeable top roll members individually and demountably fastened to the sleeve in spaced relation, a bearing element surrounding the sleeve between said roll members, said bearing element and said sleeve being relatively rotatable, a rod axially extending through and journalled in said sleeve, and guide caps demountably and rigidly secured to the ends of said rod.

4. In a top roll of the character indicated, a sleeve having a pair of spaced top roll members in unit-handling relation therewith, an outer bearing ring rotatably supported on the sleeve between the top roll members, flanged ends on said bearing ring respectively extending into the top roll members, a rod journalled in the sleeve and cap members rigidly secured to the ends of said rod and extending into said top roll members.

5. In a top roll of the character indicated, a unit-handling antifriction bearing having an outer race ring and an inner race ring axially extending out of both ends of the outer race ring, a pair of spaced top roll members demountably secured to the inner race ring at each end of said outer race ring, a rod extending through and journalled in said inner race ring, guide caps rigidly and demountably secured to the ends of said rod, an annular flange on the inner end of each guide cap, an annular flange on each end of the outer race ring, and said top roll members having counteredbored ends overlying said annular flanged portions.

6. In a top roll of the character indicated, a sleeve, a pair of spaced top roll members fastened to the sleeve, a race ring surrounding the sleeve between said top rolls, said sleeve being rotatably journalled in said race ring, a rod journalled in the sleeve, caps respectively secured to the ends of said rod and arranged to be received within guides, and means on one of said caps for preventing relative rotation between the caps and said guides.

7. In a top roll of the character indicated, a sleeve, a pair of top roll members rigidly and demountably secured on said sleeve in spaced relation, a race ring rotatably receiving said sleeve and located between said top roll members, bearings in the ends of said sleeve, a rod extending through the sleeve and journalled in said bearings, cap members threadably secured to the ends of said rod and having cylindrical guide engaging faces, and a pin projecting from one of said faces.

LELAND D. COBB.